United States Patent
Kirjavainen et al.

(10) Patent No.: US 6,217,206 B1
(45) Date of Patent: Apr. 17, 2001

(54) EXTRUDER WITH ROTOR AND BEARINGS THAT RECEIVE FORCES ACTING ON THE ROTOR

(75) Inventors: Kari Kirjavainen, Espoo; Jyri Järvenkylä, Hollola, both of (FI)

(73) Assignee: Nextrom Holding S.A., Ecublens (CH)

( * ) Notice: Subject to any disclaimer, the term of this patent is extended or adjusted under 35 U.S.C. 154(b) by 0 days.

(21) Appl. No.: 09/125,992

(22) PCT Filed: Apr. 4, 1997

(86) PCT No.: PCT/FI97/00212

§ 371 Date: Dec. 8, 1998

§ 102(e) Date: Dec. 8, 1998

(87) PCT Pub. No.: WO97/37831

PCT Pub. Date: Oct. 16, 1997

(30) Foreign Application Priority Data

Apr. 4, 1996 (FI) .......................................... 961539

(51) Int. Cl.[7] ....................................................... B29B 7/72
(52) U.S. Cl. .............................. 366/98; 366/305; 366/331
(58) Field of Search ........................ 366/69, 76.1, 96–99, 366/302, 305, 342, 343, 331; 425/133.1, 207, 209, 380, 380.3

(56) References Cited

U.S. PATENT DOCUMENTS

| | | |
|---|---|---|
| 2,779,054 * | 1/1957 | Doriat et al. ............................ 366/99 |
| 2,995,346 * | 8/1961 | Samples .................................. 366/98 |
| 3,314,108 * | 4/1967 | Wienand . |
| 3,315,944 * | 4/1967 | Gustrau .................................. 366/99 |
| 4,356,139 | 10/1982 | Rowland et al. . |
| 5,387,386 * | 2/1995 | Kirjavainen . |
| 5,538,343 * | 7/1996 | Tynan .................................. 366/302 |
| 5,674,004 * | 10/1997 | Takeuchi .............................. 425/207 |
| 6,086,239 * | 7/2000 | Jarvenkyla et al. ................... 366/98 |

FOREIGN PATENT DOCUMENTS

| | | |
|---|---|---|
| 525084 | 8/1972 | (CH) . |
| 1901163 | 8/1969 | (DE) . |
| 1554996 | 2/1970 | (DE) . |
| 1961078 | 6/1971 | (DE) . |
| 2659182 * | 7/1977 | (DE) ................................... 366/305 |
| 0207627 | 1/1987 | (EP) . |
| 89906799 | 4/1991 | (EP) . |
| 1040506 | 8/1966 | (GB) . |
| 1059595 | 2/1967 | (GB) . |
| 1604446 * | 11/1990 | (SU) ................................... 366/305 |
| 97/28949 * | 8/1997 | (WO) .................................. 366/98 |

* cited by examiner

Primary Examiner—Charles E. Cooley
(74) Attorney, Agent, or Firm—Ladas and Parry

(57) ABSTRACT

An extruder having at least one conical stator and at least one rotatable conical rotor. The rotor is mounted from its widest point with first and second bearings in such a way that the first bearing receives the forces acting in one axial direction of the rotor and the second bearing receives the forces acting in an opposite axial direction of the rotor. A method for using the extruder involves feeding a material to the extruder between the rotor and stator and rotating the rotor to cause the extruder to extrude the material.

20 Claims, 2 Drawing Sheets

EXTRUDER WITH ROTOR AND BEARINGS THAT RECEIVE FORCES ACTING ON THE ROTOR

FIELD OF INVENTION

The invention relates to an extrusion method wherein material to be extruded is fed into an extruder comprising at least one stator and at least one rotor, whereupon the stator has a conical surface at least on the side of the rotor, and which rotor has a conical surface at least on the side of the stator, the ratio of the length of the rotor to its greatest diameter being at most five-fold, and which rotor is rotated, the rotor resting on bearings provided in its widest point as it rotates.

The invention further relates to an extruder comprising at least one stator and at least one rotor, the stator having a conical surface at least on the side of the rotor, and the rotor having a conical surface at least on the side of the stator, the ratio of the length of the rotor to its greatest diameter being at most five-fold, and which rotor is mounted in bearings from its widest point to the extruder.

The invention also relates to a product prepared with the method.

BACKGROUND OF INVENTION

The length of the screw an the extruder is typically rather great with respect to the diameter of the screw. It is very difficult to mount in bearings a long screw. No matter how firmly the screw is mounted in bearings from one end, in difficult situations the screw can still bend to such an extent that it touches a cylinder positioned outside, which immediately leads to fast wearing. Arrangements have been disclosed where a long screw is also mounted in bearings from the end near the nozzle in such a way that melt plastic flows through the bearing. Such a bearing arrangement does prevent the screw from bending, but it leads to disadvantageous weld lines in the plastic mass, thus producing a weak spot in the product to be extruded.

When products having a very slippery surface are to be prepared, a large amount of slip agent must be mixed with the plastic mass to be extruded. However, a large amount of slip agent, such as silicone oil, that does not dissolve in plastic mass also results in the friction between the screw and the plastic mass being small, whereupon only a little heat is generated by the friction. The small friction results in the mass sliding in some places in the groove of the screw against the cylinder with perfect glide. However, since the plastic mass sticks in other places, a very strong bending moment easily occurs in the screw. Therefore the use of the very slippery plastic mass described above surprisingly leads into a situation where the screw wears greatly and the screw must be firmly mounted in bearings.

DE 1 961 078 discloses an extruder comprising a conical stator and a rotatable conical rotor placed outside the stator. The material to be extruded is fed between the stator and the rotor. The outer edge of the rotatable rotor is mounted to the frame with roller bearings in such a way that the bearings receive axial forces that are directed downwards in the figure. The rotor is also mounted with rolling bearings, which receive radial forces. This extruder cannot be used in a situation where the rotor is subjected axially to a force directed upwards in the figure. Further, it is not possible to monitor the forces acting on the rotor, nor to control and regulate them.

EP 89 906 779 discloses an extruder comprising at least three conical stators and at least two conical rotors placed between the stators. The material to be extruded is fed between the rotor and the stator via supply conduits. The lower surface of the rotors is mounted in bearings against a lower stator. This bearing arrangement receives the forces directed downwards, i.e. when the pressure outside the rotor is greater than the pressure inside. This bearing arrangement cannot receive radial forces or forces that are directed upwards. It is not possible either to monitor and regulate in any way the forces acting on the rotor.

The purpose of the present invention is to provide an extrusion method and an extruder comprising none of the aforementioned drawbacks.

SUMMARY OF INVENTION

The method according to the invention is characterized in that, as the rotor rotates, it rests on at least two bearings, whereupon the first bearing receives the force acting in one axial direction of the rotor and the second bearing receives the forces acting in the opposite axial direction of the rotor, and that the bearings are positioned diagonally with respect to the axial and radial direction of the extruder, the bearings receiving together the forces acting in the radial direction.

Further, the extruder according to the invention is characterized in that the rotor is mounted at least with two bearings, whereupon the first bearing receives the forces directed in one axial direction of the rotor and the second bearing receives the forces directed in the opposite axial direction of the rotor, and that the bearings are positioned diagonally with respect to the axial and radial direction of the extruder, the bearings receiving together the forces acting in the radial direction.

Further, the product prepared with the method according to the invention is characterized in that at least 0.5% of slip agent has been blended with the material of the product, and that the product is substantially without weld lines, and that the tolerance of the wall thickness of the product is less than 2%.

The efforts to solve the problem have surprisingly indicated that the sufficient length of the screw passage that is needed for melting and homogenizing the mass can be fitted into the form of a shorter screw, if the screw itself has a strongly conical shape. In such a case, the length of the screw in proportion to its diameter can be made very short, which enables a very firm bearing arrangement.

The essential idea of the invention is that the extruder comprises at least one conical stator and at least one rotatable conical rotor, and that the rotor is mounted at least with two bearings in such a way that the lower bearing receives forces directed axially downwards and the upper bearing receives forces directed upwards. Further, the idea of a preferred embodiment is that the bearings are positioned diagonally with respect to the axial and radial directions of the extruder so that the bearings receive together a radial force. The idea of yet another preferred embodiment is that the bearing arrangement comprises means for measuring the elastic displacement of the rotor, whereupon this measurement reveals the forces acting on the rotor and the stator.

The invention has the advantage that the bearing arrangement can be made very strong, whereupon products containing a large amount of slip agent can also be produced. Further, measuring the elastic displacement of the rotor makes it possible to control the forces acting on the extruder. With the arrangement according to the invention, the tolerances of the product walls can also be kept very small

BRIEF DESCRIPTION OF THE DRAWINGS

The invention will be described in greater detail in the accompanying drawings, in which.

DETAILED DESCRIPTION

Figure 1:
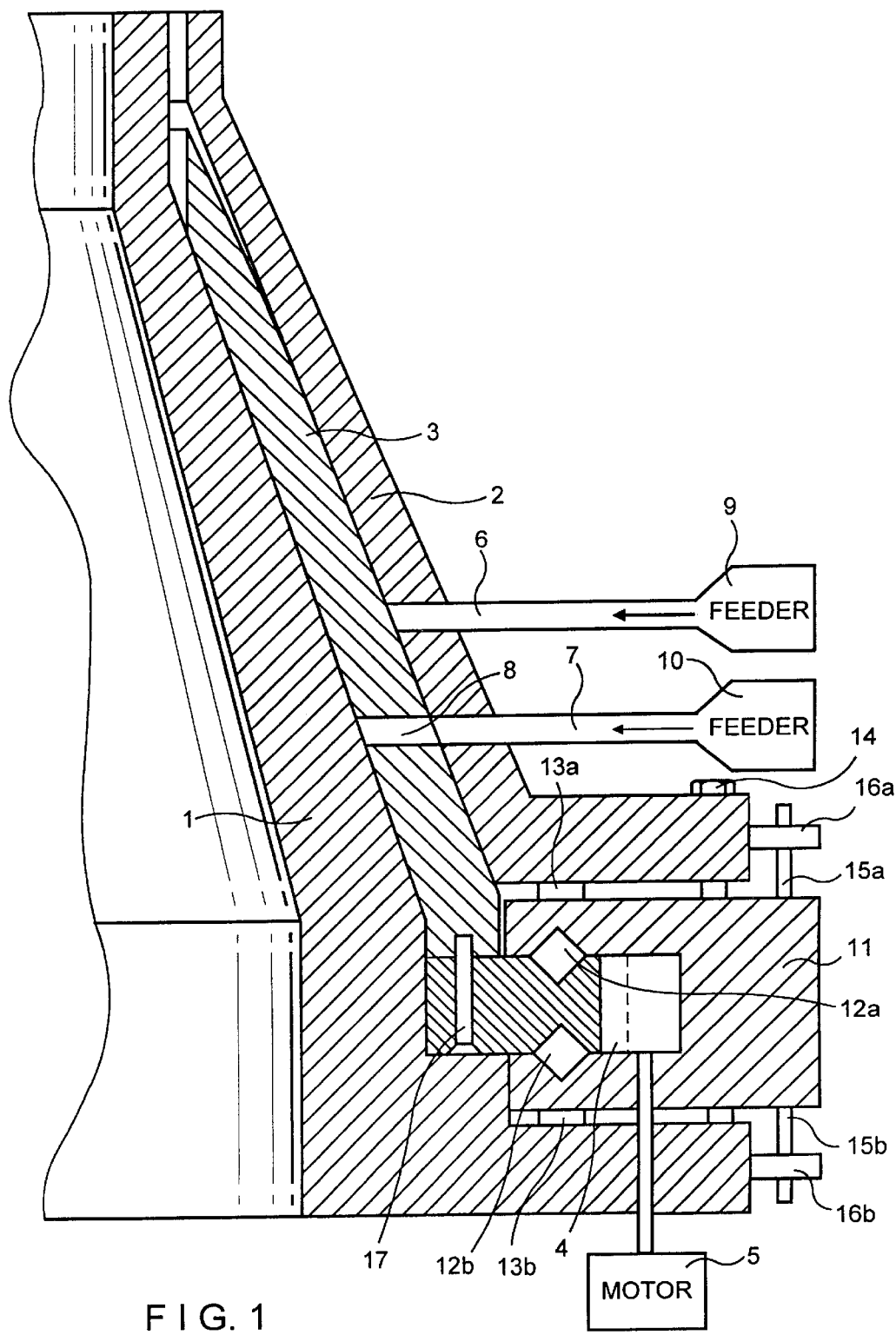
FIG. 1 is a schematic side view, in cross-section, of an extruder according to the invention.

FIG. 1 is a cross-sectional side view of an extruder according to the invention. The extruder comprises an inner stator 1 and an outer stator 2 placed outside the inner stator. At least the outer surface of the inner stator 1 and the inner surface of the outer stator 2 are conical. Between the inner stator 1 and the outer stator 2 there is a conical rotor 3. The ratio of the length of the rotor 3 to the diameter of its widest part is at most five-fold. The rotor 3 is adapted to move rotatably between the inner stator 1 and the outer stator 2. The rotor 3 is rotated by a motor 5. The motor 5 may be for example a hydraulic motor, an electric motor or some other motor that is known per se and that is suitable for the purpose. The motor 5 is adapted to rotate the rotor 3 through a gear system 4. The speed of rotation of the rotor 3 can be adjusted in a desired manner by means of the gear system 4. On the other hand, for example when an electric motor is used, the gear system 4 is not necessary, since the rotational frequency of the rotor 3 can be adjusted easily by regulating the rotational speed of the motor 5 in a manner known per se. The above-described components of the extruder are known per se, wherefore they have not been discussed in greater detail in this connection.

The extruder further comprises a first supply conduit 6 along which the material to be extruded can be fed into the exterior of the rotor 3 between the rotor 3 and the outer stator 2. The extruder also comprises a second supply conduit 7 along which material can be fed into the interior of the rotor 3 between the rotor 3 and the inner stator 1 via an opening or openings 8 provided in the rotor 3. The material to be fed into the first supply conduit 6 is supplied with a first feeding device 9. Correspondingly, for the purpose of feeding materials into the second supply conduit 7, the arrangement comprises a second feeding device 10. The feeding devices 9 and 10 can be for example feed screws, pumps or some other devices known per se. With this feeding device, the flow rate of the material to be fed into the supply conduit can be adjusted.

The rotor 3 is mounted to the gearing frame 11 with bearings 12a and 12b. The bearings 12a and 12b are placed in such a way that they restrict the movement of the rotor 3 in both ways in the axial direction of the extruder. The bearings 12a and 12b can be for example slide bearings, ball bearings or some other similar bearings. However, the bearings 12a and 12b are most preferably conical bearings, as shown in the accompanying figure. The axes of the bearings 12a and 12b, which are shown with a dotted line in the accompanying figure, are most preferably placed diagonally both in the radial and axial direction of the extruder. Therefore the upper bearing 12a receives the forces that act upwards on the rotor 3 and that result from feeding a greater material flow with the second feeding device 10 along the supply conduit 7 via the openings 8 between the rotor 3 and the inner stator 1 than with the first feeding device 9 along the supply conduit 6 between the rotor 3 and the outer stator 2. In the opposite case, the lower bearing 12b receives a force directed downwards on the rotor 3. The bearings 12a and 12b receive together a force acting radially on the rotor 3. Therefore the present bearing arrangement provides very firm bearings.

Between the gearing frame 11 and the outer stator 2 there is an upper clearance ring 13a. Correspondingly, between the inner stator 1 and the gearing frame 11 there is a lower clearance ring 13b. The clearance rings 13a and 13b can be changed, whereupon they can be used to adjust the free play between the rotor 3 and the stators 1 and 2.

The outer stator 2, the gearing frame 11 and the inner stator 1 are connected together by means of a fastening bolt 14. An upper measuring rod 15a and a lower measuring rod 15b are also connected to the gearing frame 11. The upper measuring rod 15a is connected to an upper measuring sensor 16a and the lower measuring rod 15b is correspondingly connected to a lower measuring sensor 16b. The clearance rings 13a and 13b can yield a little, if required, and on the other hand the fastening bolt 14 also stretches to some extent. Therefore it is possible to detect with the measuring sensors 16a and 16b the elastic displacement of the measuring rods 15a and 15b and thus the displacement of the gearing frame 11 and the stators 1 and 2. The measuring sensors 16a and 16b may be for example strain gauges or some other measuring devices known per se. The elastic displacement is typically of the magnitude of micrometers. The clearance rings 13a and 13b may also be spring-like, i.e. they may yield rather easily, whereupon the elastic displacement is also greater and can thus be measured more easily. Further, the clearance rings 13a and 13b may be equipped with force sensors that directly provide information about the magnitude of the forces acting on the clearance rings 13a and 13b.

When the extruder is unloaded, the signal from the measuring sensors and 16a and 16b can be defined as zero. When the pressure caused by the material to be supplied between the rotor 3 and the outer stator 2 is greater than the pressure acting between the rotor 3 and the inner stator 1, the fastening bolt 14 is subjected to a force that makes the bolt stretch. In such a case, the upper measuring sensor 16a provides a signal $\Delta S1$ that can be defined for example as positive and that describes the elastic transfer work which is thus proportional to the elongation of the fastening bolt 14, i.e. to the force acting on the bolt. Simultaneously, the gearing frame 11 is subjected to a force that is directed downwards, whereupon the lower measuring sensor 16b provides the elastic transfer work $\Delta S2$, which can be defined as negative and which is thus proportional to the force acting downwards on the gearing frame 11. Correspondingly, when the pressure between the rotor 3 and the inner stator 1 is greater than the pressure between the rotor 3 and the outer stator 2, the elongation of the fastening bolt 14, i.e. the force acting on the bolt, can be obtained from the elastic transfer work $\Delta S2$ of the lower measuring sensor 16b, which in this case is positive, and the force acting upwards on the gearing frame 11 can be determined with the signal of the upper measuring sensor 16a which describes the elastic transfer work $\Delta S1$ and which in this case is negative. Therefore it is possible to determine accurately the forces acting on the extruder by means of the signals provided by the measuring sensors 16a and 16b, and the material flows of the materials to be supplied to the extruder can be adjusted on the basis of this measurement, if required.

In connection with the assembly of the extruder frame, the fastening bolts 14 are preferably pretensioned with a hydraulic turning device to provide sufficient pretensioning. This pretensioning is provided especially preferably such that the fastening bolts 14 are hollow and contain a heating resistor. When the fastening bolts 14 are then tightened at an elevated temperature, pretensioning can be provided by lowering the temperature to the normal working temperature.

The gearing frame 11 and the bearings 12a and 12b are connected to the rotor 3 with fastening bolts 17. The gearing frame 11 and the bearings 12a and 12b thus constitute a unit that can be detached from the rest of the extruder.

FIG. 1 shows with a broken line a space to which lubricating oil is supplied in order to lubricate the gearing and the bearings 12a and 12b. By heating the lubricating oil it is possible to heat the extruder and, correspondingly, by cooling the lubricating oil it is possible to cool the extruder very easily and effectively. The clearance rings 13a and 13b must be heat conductive in order to ensure heat transfer to the entire extruder.

Since the extrusion screw according to the invention does not bend and this bearing arrangement is very firm and since the process can be controlled well with the present method, the extruder according to the invention can be used to prepare low-tolerance products also in case at least 0.5% of a slip agent is blended with the material. The plastic matrix of the product may be for example polyethylene or polyolefin, and the slip agent may be polyolefin wax, silicone oil or a fluoroplastic compound. The product to be extruded may be for example a plastic pipe, a cable sheath, a film or some other similar product. In conventional pipe extrusion, the wall tolerance is in practice about 5%, whereas the standard normally allows variation of about 10%. The tolerance of the wall thickness of the product according to the invention can be easily reduced to less than 2%. Correspondingly, the tolerances of the centring and diameter of the opening can also made small. For example when the supply flows of the material to be extruded are controlled on the basis of the measurement results of the forces acting on the extruder, it is possible to provide a wall tolerance that is less than 1%. On the other hand, adjusting the amount of the slip agent in the material to be extruded makes it possible to affect the forces acting on the extruder. For example, it is possible to supply a soft mass to the exterior of the rotor and a rigid mass to the interior of the rotor, and a required amount of slip agent can be blended with the material to be supplied to the interior, whereupon the forces acting on the extruder can be balanced by varying the amount of the slip agent. On the other hand, a substantially great constant quantity of a slip agent, for example over 5%, can be added to the material that is fed into the interior, which thus provides for example a cable tubing where a cable can be easily installed, i.e. the distance the cable can be pulled in the tubing may be very long. When such a product is prepared, it is possible to adjust the forces acting on the extruder by regulating the concentration of the slip agent in the material to be supplied to the exterior. Further, the apparatus according to the invention enables the preparation of products containing a large amount of slip agent and substantially no weld lines, which is very important since due to the effect of the slip agent the weld lines do not close well.

Figure 2:
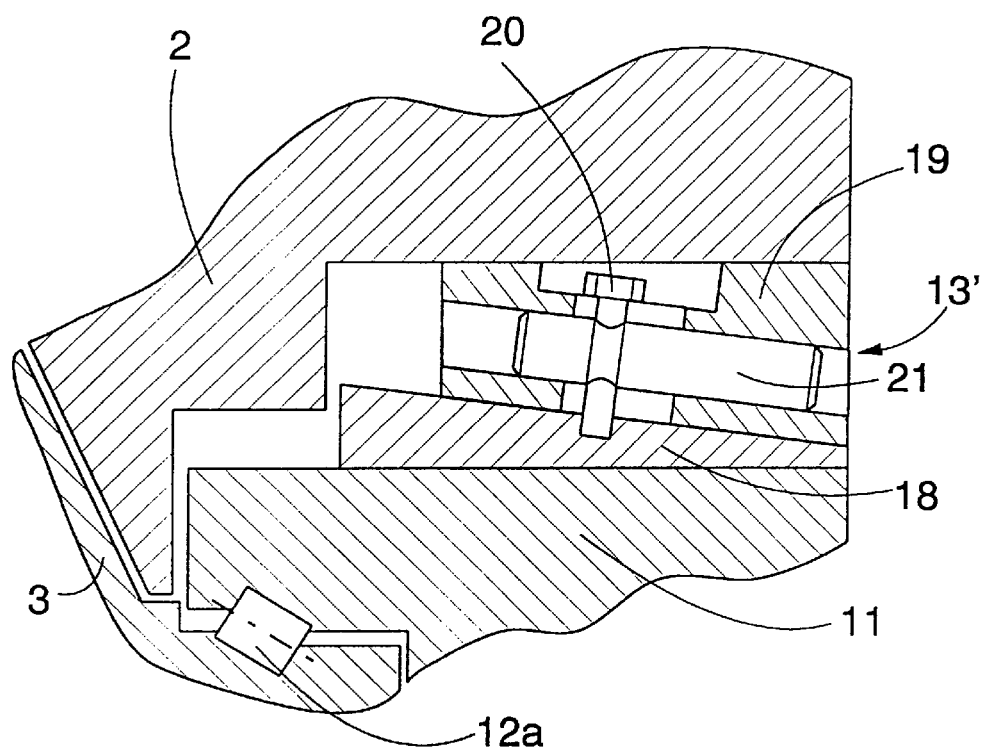
FIG. 2 is a schematic side view, in cross-section, of a part of another extruder according to the invention.

FIG. 2 is a cross-sectional side view of a part of an extruder according to the invention. The reference numerals of FIG. 2 correspond to those of FIG. 1. Instead of the clearance rings 13a and 13b, the clearance piece may be for example a clearance wedge 13'. The clearance wedge 13' consists of a wedge carrier 18 and a wedge section 19 and a fastening screw 20 and an adjusting screw 21. The wedge carrier 18 is attached to the gearing frame 11 for example with screws. The fastening screw 20 is in turn connected immovably to the wedge carrier 18. The fastening screw 20 and the adjusting screw 21 are placed in such a way that they are otherwise immovable with respect to each other but the adjusting screw 21 is able to rotate about its axis. When the adjusting screw 21 is rotated, it remains in place and simultaneously moves the wedge section 19 with respect to the wedge carrier 18. Therefore, by rotating the adjusting screw 21 it is possible to adjust the clearance between the rotor and the stator in a very easy and simple manner.

Figure 3:
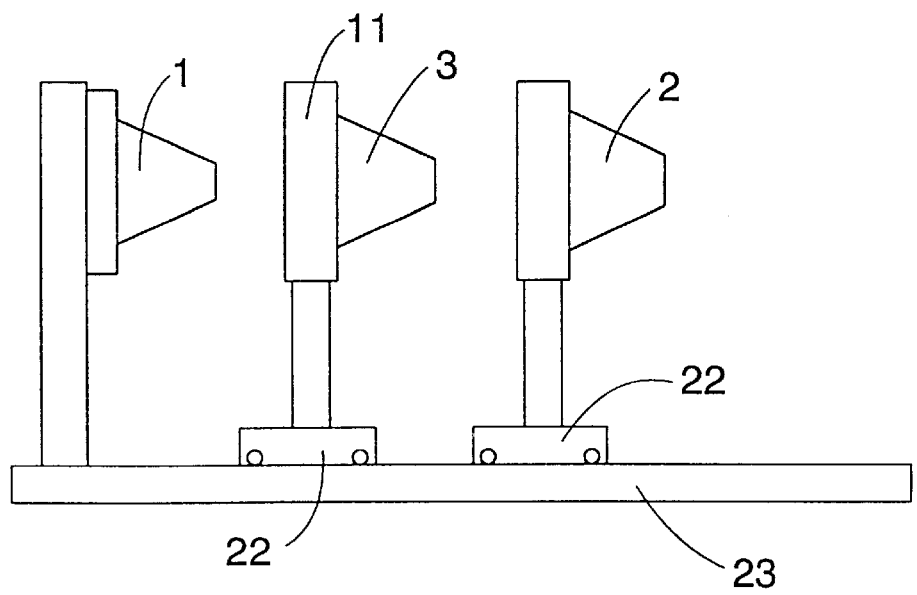
FIG. 3 is a schematic side view of the extruder of FIG. 1 during maintenance.

FIG. 3 shows an extruder according to the invention during maintenance. The reference numerals of FIG. 3 correspond to those of FIGS. 1 and 2. The end of the extruder in a conventional extrusion apparatus comprises a tool, which rests on its own support. The apparatus is usually disassembled such that the tool is turned to a vertical position and the parts are removed from one another by lifting with a lifting device. Since the structure of the extruder according to the invention is very simple, the disassembly operation can be carried out cleverly in an entirely new manner. The outer stator 2 and correspondingly the unit formed by the rotor 3 and the gearing frame 11 are placed on separate wagons 22. The wagons 22 are in turn arranged to move on a rail 23. Further, the wagons 22 can be placed partly one within the other. Thus, after the fastening bolts have been unloosened, the different parts can be pulled apart along the rail 23 provided in the axial direction of the extruder for the purpose of cleaning and maintenance. With this simple method, it is possible to avoid dents that easily occur during assembly. Compared to the disassembly of a conventional tool and the cleaning of an extruder, the apparatus of FIG. 3 saves time more than tenfold.

The drawings and the description related thereto are only intended to illustrate the inventive idea. The details of the invention may vary within the scope of the claims. Therefore there may be more than two stators and more than one rotor, whereupon it is possible to prepare for example products with several layers. Further, there may be more than one measurement arrangement, for example preferably four arrangements that are positioned on the circumference of the extruder at intervals of 90°, whereupon the comparison of the signals from each measurement point provides information about the forces acting on different parts of the extruder, and the temperatures in the different parts of the extruder can be adjusted as the need arises, so that the tolerances of the product can be kept as small as possible. It is also possible to leave out one of the stators of the extruder, whereupon the material to be extruded is naturally supplied only to one side of the rotor between the rotor and the stator.

What is claimed is:

1. An extruder comprising:
  (a) at least one stator;
  (b) at least one rotor, the rotor having a side facing the stator with a conical surface, the stator having a side facing the rotor with a conical surface, the rotor having a diameter at a widest point thereof and a length, a ratio of the length of the rotor to the diameter at the widest point being at most five-fold; and
  (c) mounting means, comprising at least first and second bearings, for mounting the rotor in the extruder at the widest point of the rotor such that the first bearing receives forces directed in a first axial direction of the rotor and the second bearing receives forces directed in a second axial direction of the rotor that is opposite the first axial direction and such that the first and second bearings together receive forces acting in a radial direction of the rotor, each of said first and second bearings having an axis that is diagonal to each of the first and second axial directions and the radial direction.

2. An extruder according to claim 1, further comprising measuring means disposed between the rotor and the stator for measuring elastic displacement between the rotor and the stator.

3. An extruder according to claim 1, wherein the first and second bearings are conical bearings.

4. An extruder according to claim 1, comprising a gearing frame, said gearing frame and said first and second bearings together comprising a unit that is detachable from the rest of the extruder.

5. An extruder according to claim 1, comprising a gearing frame, said gearing frame and the rotor together comprising a unit that is movable with a wagon along a rail that is parallel to an axis of the extruder.

6. A kit comprising the extruder of claim 5, the wagon and the rail.

7. A method for extruding material comprising:
    (a) providing the extruder of claim 1;
    (b) feeding the material to the extruder between the stator and the rotor and rotating the rotor to cause the extruder to extrude the material.

8. A method according to claim 7, comprising measuring an elastic displacement between the rotor and the stator and determining the forces acting on the extruder on the basis of the measuring.

9. A method according to claim 8, wherein a slip agent is blended with the material that is fed to the extruder, said method comprising adjusting an amount of the slip agent that is blended with the material on the basis of the measuring.

10. An extruder according to claim 7, wherein the bearings are lubricated with lubricating oil, said method comprising controlling a temperature of the extruder by adjusting a temperature of the lubricating oil.

11. An extruder according to claim 7, wherein the extruder comprises a frame and a plurality of fastening bolts that are mounted in the frame, the frame being assembled with pretensioning that is provided by heating the fastening bolts before they are mounted and by cooling the bolts after they are mounted.

12. An extruder comprising
    (a) at least one rotatable conical rotor, the rotor having a diameter at a widest point thereof and a length, a ratio of the length of the rotor to the diameter at the widest point being at most five-fold;
    (b) at least two stators, including an inner stator and an outer stator, the inner stator having at least an outer surface that is conical, the outer stator having at least an inner surface that is conical, said at least two stators being disposed in the extruder with the at least one rotor therebetween;
    (c) mounting means, comprising at least first and second bearings, for mounting the rotor in the extruder at the widest point of the rotor such that the first bearing receives forces directed in a first axial direction of the rotor and the second bearing receives forces directed in a second axial direction of the rotor that is opposite the first axial direction and such that the first and second bearings together receive forces acting in a radial direction of the rotor, each of said first and second bearings having an axis that is diagonal to each of the first and second axial directions and the radial direction; and
    (d) measuring means for measuring separately elastic displacement between the rotor and the outer stator and elastic displacement between the rotor and the inner stator.

13. An extruder according to claim 12, wherein the first and second bearings are conical bearings.

14. An extruder according to claim 12, comprising a gearing frame, said gearing frame and said first and second bearings together comprising a unit that is detachable from the rest of the extruder.

15. An extruder according to claim 12, comprising a gearing frame, said gearing frame and the rotor together comprising a unit that is movable with a wagon along a rail that is parallel to an axis of the extruder.

16. A kit comprising the extruder of claim 15, the wagon and the rail.

17. A method for extruding material comprising:
    (a) providing the extruder of claim 12;
    (b) feeding the material to the extruder between the inner stator and the rotor and between the outer stator and the rotor and rotating the rotor to cause the extruder to extrude the material; and
    (c) separately measuring an elastic displacement between the rotor and the inner stator and an elastic displacement between the rotor and the outer stator and determining the forces acting on the stators and the rotor on the basis of the measuring.

18. An extruder according to claim 17, wherein a slip agent is blended with the material that is fed to the extruder, said method comprising adjusting an amount of the slip agent that is blended with the material on the basis of the measuring.

19. An extruder according to claim 17, wherein the bearings are lubricated with lubricating oil, said method comprising controlling a temperature of the extruder by adjusting a temperature of the lubricating oil.

20. An extruder according to claim 17, wherein the extruder comprises a frame and a plurality of fastening bolts that are mounted in the frame, the frame being assembled with pretensioning that is provided by heating the fastening bolts before they are mounted and by cooling the bolts after they are mounted.

* * * * *